(12) United States Patent
Joyce et al.

(10) Patent No.: US 12,104,961 B2
(45) Date of Patent: Oct. 1, 2024

(54) METHOD AND APPARATUS FOR MEASURING TEMPERATURE WITHIN A GIVEN TEMPERATURE RANGE USING A SELECTED TEMPERATURE SENSOR

(71) Applicant: Illinois Tool Works Inc., Glenview, IL (US)

(72) Inventors: Richard Charles Joyce, Sherwood, WI (US); Kevin John Mlnarik, De Pere, WI (US); Paul Verhagen, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 417 days.

(21) Appl. No.: 16/742,280

(22) Filed: Jan. 14, 2020

(65) Prior Publication Data
US 2020/0149970 A1    May 14, 2020

Related U.S. Application Data

(63) Continuation of application No. 14/656,346, filed on Mar. 12, 2015, now Pat. No. 10,533,897.

(51) Int. Cl.
*G01J 5/00* (2022.01)
*G01J 5/12* (2006.01)
(Continued)

(52) U.S. Cl.
CPC .............. *G01J 5/0096* (2013.01); *G01J 5/12* (2013.01); *G05D 23/1928* (2013.01); *G05D 23/22* (2013.01); *G05D 23/27* (2013.01)

(58) Field of Classification Search
CPC ........... G01J 5/0096; G01J 5/12; G05D 23/27
See application file for complete search history.

(56) References Cited

U.S. PATENT DOCUMENTS 4,359,622 A * 11/1982 Dostoomian ........ B23K 11/252
219/110
4,527,896 A * 7/1985 Irani ........................ G01J 5/04
374/128
(Continued)

FOREIGN PATENT DOCUMENTS

CN           1668486      9/2005
CN         103188990      7/2013
(Continued)

OTHER PUBLICATIONS

Anderson, Russell, "Adjusting the A/D voltage reference to provide Gain", Analog Applications Journal, (3Q, 2002) pp. 5-6.

(Continued)

*Primary Examiner* — David P Porta
*Assistant Examiner* — Casey Bryant
(74) *Attorney, Agent, or Firm* — McAndrews, Held & Malloy, Ltd.

(57) ABSTRACT

A device providing a temperature control and/or monitoring and a method for use of the device are disclosed. In the disclosed method and device, a controller receives a minimum temperature value and a maximum temperature value of a temperature range to be measured. The controller correlates a known output signal range of a temperature sensor to the temperature range to be measured. Further, the controller receives an output signal from the temperature sensor, and generates a measured temperature value based on the output signal of the temperature sensor.

20 Claims, 7 Drawing Sheets

(51) Int. Cl.
*G05D 23/19* (2006.01)
*G05D 23/22* (2006.01)
*G05D 23/27* (2006.01)

(56) References Cited

U.S. PATENT DOCUMENTS

| | | | |
|---|---|---|---|
| 4,527,897 A | 7/1985 | Okabe | |
| 5,519,644 A * | 5/1996 | Benton | G01K 1/026 73/1.88 |
| 6,911,089 B2 * | 6/2005 | Latvis | B05C 9/14 118/712 |
| 2006/0289492 A1* | 12/2006 | Thomas | H05B 6/06 219/660 |
| 2006/0289495 A1* | 12/2006 | Thomas | H05B 6/101 219/677 |
| 2008/0174629 A1 | 7/2008 | Suzuki | |
| 2010/0100351 A1 | 4/2010 | Kobayashi | |
| 2012/0004880 A1* | 1/2012 | Hsu | G01K 1/028 374/170 |
| 2012/0132642 A1 | 5/2012 | Broders | |
| 2012/0323379 A1 | 12/2012 | Robertson, III | |
| 2014/0033928 A1 | 2/2014 | Adam | |
| 2014/0061476 A1 | 3/2014 | Baleine | |
| 2021/0162530 A1* | 6/2021 | Anderson | B23K 13/01 |

FOREIGN PATENT DOCUMENTS

| | | |
|---|---|---|
| CN | 104284716 | 1/2015 |
| GB | 2119925 | 11/1983 |
| JP | 2008170419 | 7/2008 |
| WO | 2012027739 | 3/2012 |

OTHER PUBLICATIONS

European Patent Office Communication Appln 16719558.5 dated Oct. 17, 2018.
Miller Electric Mfg. Model No. 266076 Information Sheet.
Oil & Gas Pipeline, Welding & Heating Solutions Brochure, Miller and Hobart Brothers, #259846 (2012).
ProHeat Rolling Inductor, Induction Heating System, Miller Electric Mfg. Co., Index No. IN/12.0, issued Nov. 2014.
ProHeat35 CE and Non CE Models Owners Manual, Miller Electric Mfg., OM-222 166U, Jan. 2011.
ProHeat35 Weld Preheating and Stress Relieving, Induction Heating System, Miller Electric Mfg. Co., Index No. N/11.0 issued Jun. 2013.

* cited by examiner

FIG. 1

PRIOR ART

```
Deg Units...: °F              SYSTEM SETUP1
Tolerance...: +/-25
Control Mode: Manual    RI Init KW: 00 KW
Max Output..: 35 KW     RI Clr Purge: 300s
```

FIG. 5A

```
TC1,2 Type...: IR4-20       SYSTEM SETUP2
IR Input Max.:  750    Trvl Detect..: Off
IR Input Min.:  212    Trvl Speed...: IPM
Decouple Fault: On
```

METHOD AND APPARATUS FOR MEASURING TEMPERATURE WITHIN A GIVEN TEMPERATURE RANGE USING A SELECTED TEMPERATURE SENSOR

CROSS REFERENCE TO RELATED APPLICATIONS

This application is a continuation of, and claims priority to and the benefit of, U.S. application Ser. No. 14/656,346, filed on Mar. 12, 2015, and entitled "Method and Apparatus for Measuring Temperature within a Given Temperature Range Using a Selected Temperature Sensor." The above listed U.S. Application is hereby incorporated by reference in its entireties for all purposes.

TECHNICAL FIELD

The present disclosure relates generally to measuring temperature within a desired temperature range using a temperature sensor, and is particularly pertinent for induction power sources used in welding applications.

BACKGROUND

An induction power source used in welding applications, such as the ProHeat® 35 available from Miller Electric Manufacturing Co. (hereafter "ProHeat® 35"), provides induction heating for weld applications including pre-heating, stress relief, and post-weld heating. For example, providing heating to a workpiece can keep moisture out of a weld to mitigate hydrogen-induced cracking, prevent hot and cold spots, etc. To accommodate different parts and applications, the ProHeat® 35 is used with a number of accessories, including a rolling inductor accessory having a rolling inductor (such as ProHeat® Rolling Inductor available from Miller Electric Manufacturing Co.) for providing uniform heat to moving parts.

Figure 1:
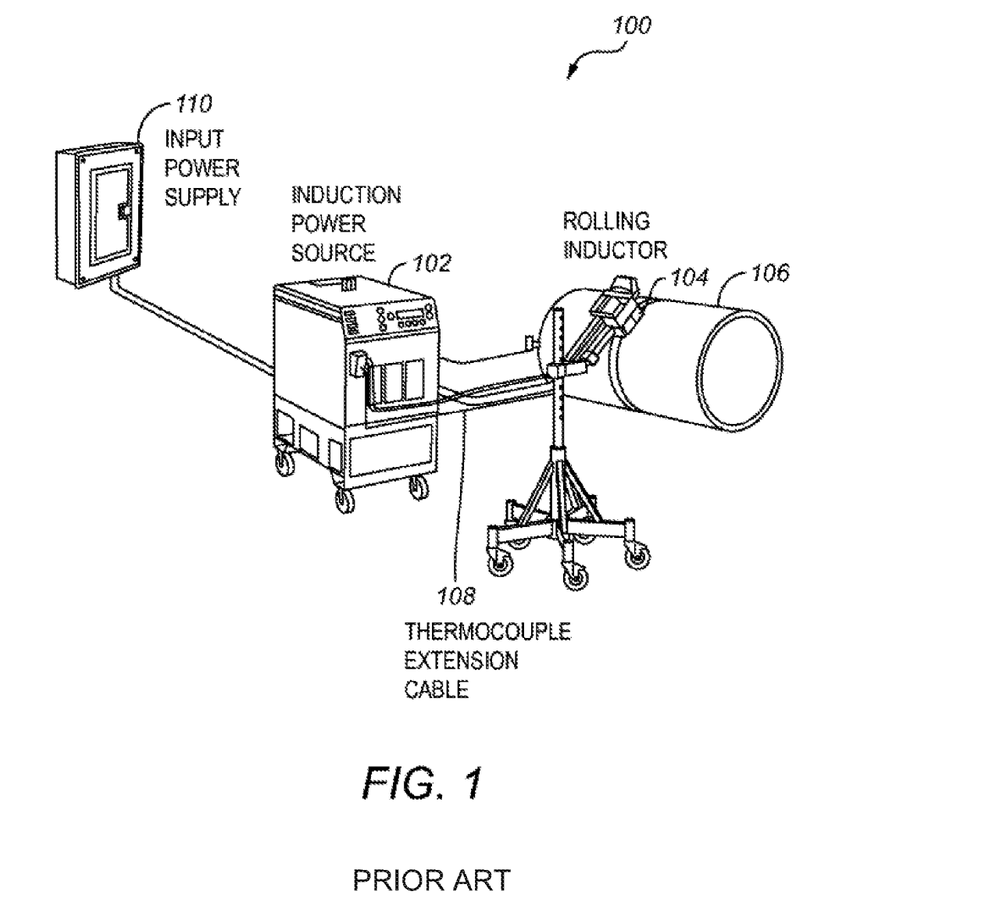
FIG. 1 illustrates a heating system including an induction power source and a rolling inductor system.

FIG. 1 shows an example of an induction heating system 100 comprising, among others, an induction power source 102, a rolling inductor 104 via which heat is provided to a pipe 106, a thermocouple extension cable 108, and a input power supply 110 supplying power to the induction power source 102. In the system arrangement of FIG. 1, the thermocouple extension cable 108 carries output signal(s) from one or more thermocouples that provide a temperature feedback used for temperature control and monitoring. For instance, the ProHeat® 35 currently provides up to six thermocouple inputs used by a built-in controller that performs temperature control and monitoring of the rolling inductor 104.

When using a rolling inductor, it can be difficult to measure temperature at a location of the workpiece the rolling inductor is heating. Since a workpiece or the rolling inductor is moving, unlike in the case of stationary parts, using a thermocouple in contact with the workpiece does not produce accurate temperature readings. For example, in the arrangement of FIG. 1, a thermocouple welded to a given point on the pipe rotates 360 degrees and measures the pipe temperature as it is heated and cooled, but only at one point Controlling heat input from this point could result in overheating the pipe before the point and under heating the pipe shortly after the point.

SUMMARY

One possible solution to the above-noted problem is to use another type of a temperature sensor, such an infrared (IR) temperature sensor. In this regard, the IR temperature sensor can be mounted to the rolling inductor to measure a temperature very close to the point where the rolling inductor is heating. However, there is a problem that wide range IR temperature sensors are sensitive to emissivity changes. There is a need to calibrate for emissivity coefficients of the surfaces being measured. This is particularly a problem with a surface that moves relative to the sensor as the emissivity coefficient can change. For example, a rotating part can have low and high emissivity regions. IR temperature sensors that are less sensitive to emissivity changes have limited temperature ranges and often do not cover a heating range of a given heating device, such as the ProHeat® 35.

In effect, selecting one particular IR sensor can limit a temperature range and an application for which a rolling inductor can be used. Therefore, what is needed is a way to use a desired temperature sensor while also covering a requisite temperature range of a given application.

The present disclosure provides an adjustable temperature scale for a temperature sensor, giving a user an ability to select a temperature sensor that has desired operational characteristics but also fits an application requiring a particular temperature range to be measured.

In an embodiment, a device providing a temperature control and/or monitoring comprises (i) a controller and (ii) program logic held in a data storage and executable by the controller to cause the controller to (a) receive a minimum temperature value and a maximum temperature value of a temperature range to be measured, (b) correlate a known output signal range of a temperature sensor to the temperature range to be measured, c) receive an output signal from the temperature sensor, and (d) generate a measured temperature value based on the output signal of the temperature sensor.

In an embodiment, the program logic further causes the controller to control or monitor temperature with respect to a part whose temperature is being measured using the measured temperature value.

In an embodiment, the program logic further causes the controller to display the measured temperature value to a user.

In an embodiment, the temperature sensor is an infrared (IR) temperature sensor.

In an embodiment, the temperature sensor is interconnected with the device via an input interface.

In an embodiment: (a) the output signal is a current signal, and (b) the input interface carries the output signal converted to a voltage signal via a biasing resistor.

In an embodiment: (a) the device further comprises one or more temperature sensor inputs for receiving inputs from a temperature sensor of a first temperature sensor type, (b) the temperature sensor is of a second temperature sensor type different from the first temperature sensor type, and (c) the output signal range of the temperature sensor received via the one or more temperature sensor inputs is different from an output signal range of the temperature sensor of the first temperature sensor type received via the one or more temperature sensor inputs such that the two output signal ranges do not overlap.

In an embodiment, the program logic causes the controller to correlate a minimum output signal of the temperature sensor to the minimum temperature value and correlate a maximum output signal of the temperature sensor to the maximum temperature value.

In an embodiment, the program logic causes the controller to correlate the known output signal range of the temperature sensor to the temperature range to be measured using a linear scale.

In an embodiment, the linear scale follows the following relationship:

$$\text{Temp} = (((AD\_RawInput - I_{AD\_RawMin}) * (T_{\_MaxTemp} - T_{\_MinTemp})) / ((I_{AD\_RawMax} - I_{\_RawMin}))) + T_{\_}$$

where, $T_{\_MinTemp}$ and $T_{\_MaxTemp}$ are the minimum and maximum temperature values, respectively, and $I_{AD\_RawMin}$ and $I_{AD\_RawMax}$ are analog-to-digital (A/D) values corresponding to minimum and maximum output current signals of the temperature sensor, respectively.

In an embodiment: (a) the device further comprises an A/D converter, and (b) the A/D values are computed as follows:

$$AD\_RawInput = ((I_{\_Output} * R_{\_Bias} * 2^{\^{}Scale} * \text{Gain})) / V\_ref,$$

where, $I_{\_output}$ is a current output signal, $R_{\_Bias}$ is a value of a biasing resistor for conversion of the current output signal to an output voltage signal to be input to an A/D converter, and Scale, Gain, and V_ref are values of N for an N-bit converter, A/D gain, and reference voltage for the A/D converter, respectively.

In an embodiment, a temperature affecting device is controlled based at least in part on the expressed measured temperature value.

In an embodiment, the output signal is a voltage signal, the voltage of which correlates to the measured temperature value.

In an embodiment, the output signal is a current signal, the amperage of which correlates to the measured temperature value.

In an embodiment, the output signal is a digital signal, the pulse width or numerical value of which correlates to the measure temperature value.

In an embodiment, a method for use with a device providing a temperature control and/or monitoring comprises (i) receiving, via a controller, a minimum temperature value and a maximum temperature value of a temperature range to be measured, (ii) correlating, via the controller, a known output signal range of a temperature sensor to the temperature range to be measured, (iii) receiving, via the controller, an output signal from the temperature sensor, and (iv) generating via the controller, a measured temperature value based on the output signal of the temperature sensor. In one example, the temperature sensor is an IR temperature sensor and the measured temperature value is expressed as an electrical signal.

In an embodiment, the measured temperature value is used by the controller to control or monitor temperature with respect to a part whose temperature is being measured.

In an embodiment, the measured temperature value in the form of a temperature reading is provided by the controller for display to a user.

Additional features and advantages of embodiments will be set forth in the description, which follows, and in part will be apparent from the description.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

The present disclosure is herein described in detail with reference to embodiments illustrated in the drawings, which form a part hereof Other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the present disclosure.

Figure 2:
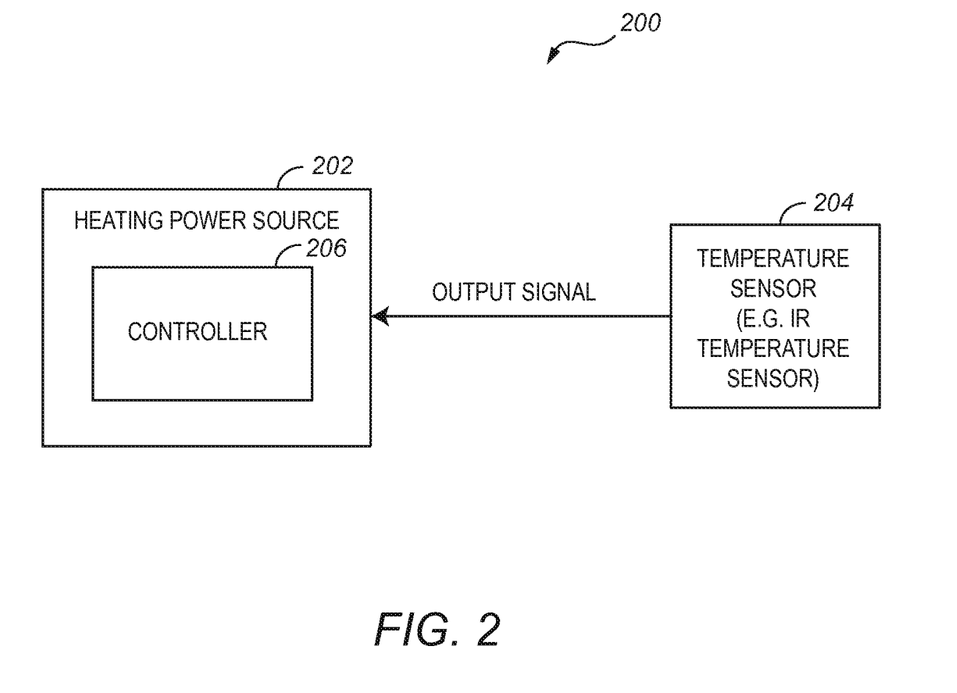
FIG. 2 is a simplified block diagram of a system in which the illustrative embodiment can be carried out.

FIG. 2 depicts a simplified block diagram of a system 100 in which an illustrative embodiment of the present invention can be carried out. As shown in FIG. 2, the system 200 comprises a heating power source 202 coupled with a temperature sensor 204. As shown in FIG. 2, the heating power source 202 includes a controller 206. Although not illustrated, the temperature sensor 204 and the controller 206 may be interconnected via a suitable input interface located externally or internally to the controller 206. In the illustrative embodiment, the heating power source 202 preferably is an induction power source, such as the ProHeat® 35. On the other hand, the temperature sensor 204 preferably is an IR temperature sensor. One example of a suitable IR temperature sensor is an IR sensor with a narrow temperature range but good emissivity sensitivity (i.e., less affected by emissivity differences), preferably a programmable sensitivity. Such an IR sensor preferably outputs a current signal in a range of 4-20 mA, and the sensitivity can be programmed to limit reading errors to within plus or minus 25 degrees Farehnheit. Such a sensor can have a 2 micron optical filter range. However, in alternative embodiments, another heating power source and/or temperature sensor may be used instead.

As a general matter, in accordance with the illustrative embodiment, the controller 206 is configured to correlate a range of an output signal (or "output signal range," for short) of the temperature sensor 204 to a desired temperature range to be measured, such as a temperature range selected by a user. In this regard, the controller 206 is then able to determine a current temperature within that temperature range based on an output signal of the temperature sensor 204 received by the heating power source 202.

Figure 3:
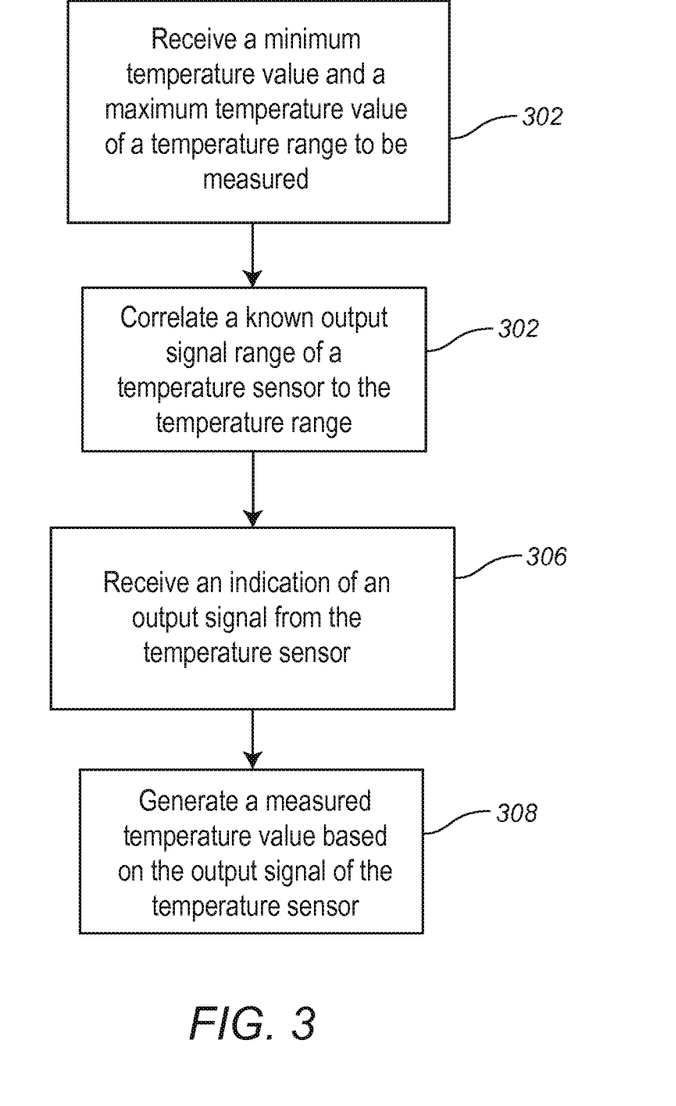
FIG. 3 is a flow chart showing an exemplary set of functions that can be carried out using the system of FIG. 2.

FIG. 3 is a flow chart summarizing an example set of functions that could be carried out in accordance with the arrangement of FIG. 2, for instance. At step 302, the controller 206 receives a minimum temperature value and a maximum temperature value of a temperature range to be measured. At step 302, the controller 206 correlates a known output signal range of a temperature sensor to the temperature range. At step 304, the controller 206 receives an output signal from the temperature sensor. At step 306, the controller generates a measured temperature value based on the output signal of the temperature sensor.

The measured temperature value can be expressed in a number of different ways, but typically is some type of electrical signal. One example is a voltage signal the voltage of which varies in accordance with and correlates to the measured temperature value. Another example is a current signal the amperage of which varies and correlates to the measured temperature value. Yet another example is a digital signal the pulse width (if only a single pulse), pulse count (if multiple pulses) or numerical value (if using a system such as an ASCII or a power based system) of which varies and correlates to the measured temperature value.

The electrical signal in turn can be used to control a temperature affecting device such as the power source 202, the power output of which can be controlled to affect the heat applied to the measured point(s).

In accordance with the illustrative embodiment, the controller 206 executes program logic to carry out various functions described herein, such as those in FIG. 2 for instance. The program logic may define an algorithm configured to correlate the output signal range of the temperature sensor 204 to a predetermined temperature range. In the illustrative embodiment, the algorithm is configured such that a minimum output signal value of the temperature sensor 204 corresponds to a minimum temperature value of the predetermined temperature range and a maximum output signal value of the temperature sensor 204 corresponds to a minimum temperature value of the predetermined temperature range. In this regard, the algorithm creates a linear scale that provides a linear relationship between an output signal within the output signal range of the temperature sensor 204 and a temperature within the predetermined temperature range. This way, temperature values within the predetermined temperature range can be generated by the controller 206 based on an output signal of the temperature sensor 204.

In the illustrative embodiment, the temperature sensor 204 outputs a current signal. In one example, the output current signal is in a preferred range of 4-20 mA. Further, the algorithm is configured to correlate the output signal range of the temperature sensor 204 to a predetermined temperature range according to the following formula:

$$\text{Temp} = (((AD_{RawInput} - I_{AD\_RawMin}) * (T_{MaxTemp} - T_{MinTemp})) / ((I_{AD\_RawMax} - I_{RawMin}))) + T_{MinTemp} \quad \text{Equation (1)}$$

where, $T_{MinTemp}$ and $T_{MaxTemp}$ are minimum and maximum temperature inputs, respectively, and $I_{AD\_RawMin}$ and $I_{AD\_RawMax}$ are analog-to-digital (A/D) values corresponding to minimum and maximum output current signals of a temperature sensor, respectively.

The A/D values are associated with an A/D converter of the heating power source 202 and are computed according to the following formula:

$$\text{AD\_RawInput} = ((I_{Output} * R_{Bias} * 2^{Scale} * \text{Gain})) / V\_ref \quad \text{Equation (2)}$$

where, $I_{Output}$ is a current output signal, $R_{Bias}$ is a value of a biasing resistor for conversion of the current output signal to an output voltage signal to be input to the A/D converter, and Scale, Gain, and V_ref are values of N for an N-bit converter, A/D gain, and reference voltage for the A/D converter, respectively.

As can be seen from the above Equation (1), the sensor output signal range is correlated to a temperature range defined by the minimum and maximum temperature inputs such that the minimum value of the output current signal of the temperature sensor 204 corresponds to the minimum temperature input. On the other hand, the maximum value of the output current signal of the temperature sensor 204 corresponds to the maximum temperature input. Measured temperature values corresponding to the sensor's output current signals are generated using a linear scale set up based on the minimum and maximum temperature inputs.

The measured temperature value may be subsequently used by the controller 202 in the form of a digital or analog signal to perform other functions such as temperature control and/or monitoring. In one example, the controller 202 may use a signal indicative of the measured temperature value as a feedback in controlling heating and cooling of a part to which a heat is applied, such as via a rolling inductor. The control of heating or cooling can be effected by controlling the application of a signal to the rolling inductor or another heat source. In another example, the controller 202 may use such a signal to monitor a temperature at a given point (e.g., on a workpiece) to ensure that the measured temperature is at a desired level. In yet another example, the controller 202 may send the signal indicative of the measured temperature value to be displayed to a user as a temperature reading on a display of the heating power source 202. Other examples may be possible as well.

In the present example, the temperature sensor output is in the form of a current signal, such as in the range of 4 mA to 20 mA. In this case, the output current signal is converted to a voltage signal for input to an A/D converter associated with the heating power source 202 via a biasing resistor (or "$R_{Bias}$" in the Equation (2)). The biasing resistor sets a voltage range to be input to an A/D converter of the heating power source 202. The A/D values are, in turn, used to compute a current temperature value from a current temperature sensor input to the heating power source 202.

To illustrate, in the case of the ProHeat® 35 and IR temperature sensor with a 4-20 mA output range, the biasing resistor is preferably a 20 ohm resistor that sets a voltage range of 80 mV to 400 mV to be input to A/D converter of the ProHeat® 35. For this input voltage range, in the above Equation (2), the values for the gain G, voltage reference V_Ref, and Scale parameters for the ProHeat A/D converter are 4, 18, and 2.048 V DC, respectively. The A/D input values are, in turn, used in Equation (1) to compute a current temperature value from a current temperature sensor input to the heating power source 202.

It should be noted, however, the above example is provided for illustrative purposes only, and one skilled in the art will appreciate that the above equations could be used and/or modified accordingly to accommodate temperature sensors with other output signal ranges and heating power sources having different operational characteristics from those provided above.

It is also noted that the term "output signal" of the sensor as used herein, refers not only to the signal directly output from the sensor, but also a converted version of the signal, unless specifically noted otherwise. Both are directly correlated to the sensed temperature and thus indicative of the temperature.

Figure 4:
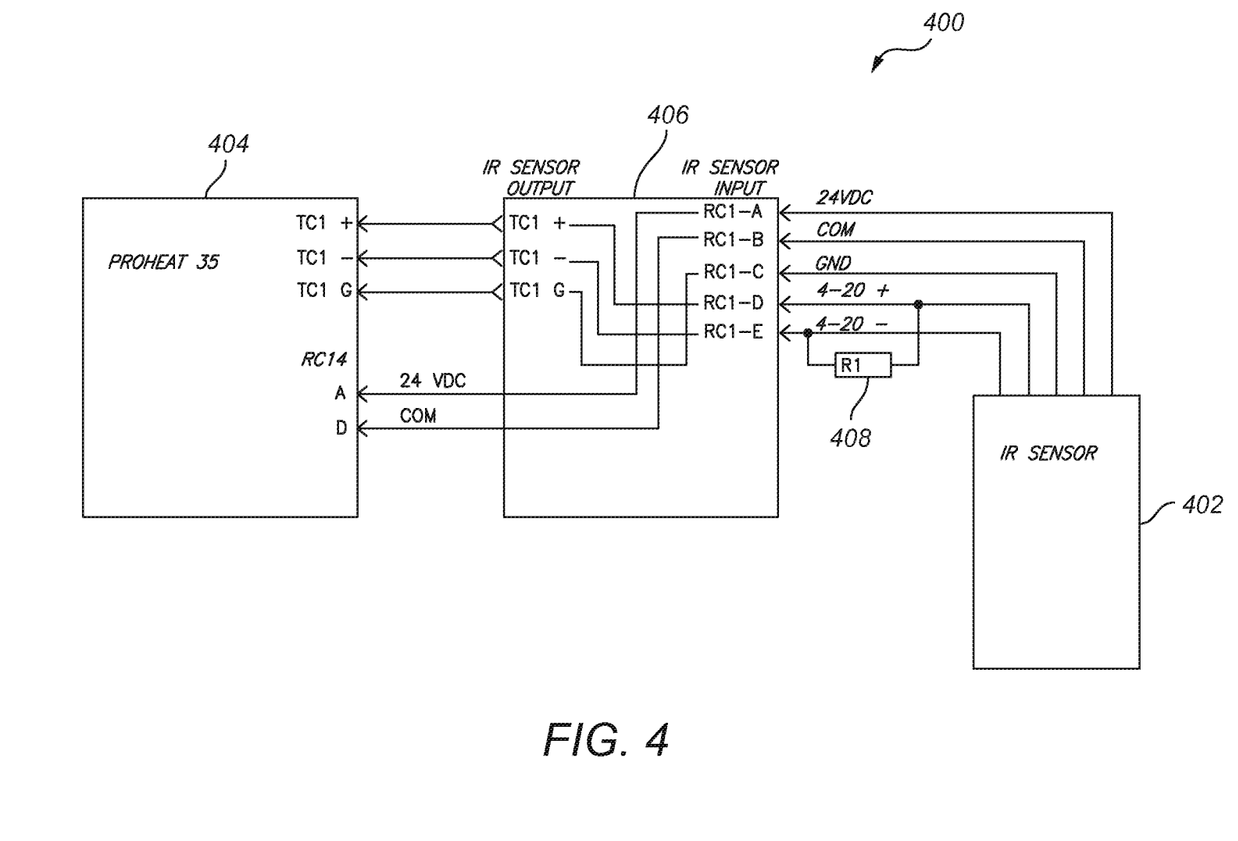
FIG. 4 illustrates one example arrangement showing an interconnection of an IR temperature sensor to a heating power source.

FIG. 4 illustrates one exemplary arrangement 400 showing an interconnection of an IR temperature sensor 402 to a heating power source 404. More specifically, as shown in FIG. 4, the IR temperature sensor 402 is interconnected to the heating power source 404 via an input interface 406. As shown in FIG. 3, in this example arrangement, the heating power source 404 is the ProHeat® 35. The, input interface 406 could be internal or external to the heating power source 404.

In the arrangement of FIG. 4, an analog output signal from the IR temperature sensor 402 is supplied to IR sensor inputs "RC1-D" and "RC1-E" on the input interface 406. For example, an IR sensor, provides analog output wires via which the sensor can be connected to a controller with the 24 V DC power supply. As such, as shown in FIG. 3, the 24 VDC and COM (aka "common") outputs on the heating power source 404 can be connected to power IR sensor inputs on the input interface 406 (e.g., "RC1-A" and "RC1-B" inputs) to power up the IR sensor with 24 V DC. On the other hand, the sensor output signal is converted to a voltage signal using a biasing resistor 408 (e.g., a 20 ohm resistor). The voltage signal, together with a ground lead for the IR sensor 402, coming out of IR sensor outputs on the input interface 406 is, in turn, fed into respective thermocouple inputs (e.g., "TC1" inputs representing positive, negative, and ground terminals) on the heating power source 404.

In one embodiment, the input interface 404 may be in the form of a board or a sheet metal carrying wire connectors interconnecting the IR inputs and IR outputs. However, the input interface may take other forms as well (e.g., a connection box). Additionally, although FIG. 4 shows the input interface being external to the heating power source 404, it may be possible to integrate such input interface with the heating power source 404, such as the ProHeat® 35. Further, as shown in FIG. 4, the biasing resistor 408 may be installed at the end of an IR temperature sensor cable at the input interface 406.

Further, although a hard-wired connection arrangement is discussed above, the sensor and controller could be connected by means of wireless communications. Such communications could be of any suitable type, such as, to name a few, a proprietary radio communications protocol, any of the Bluetooth® protocols or any of the IEEE wireless protocols. The output signal could be in an analog or digital format. The key is for the output signal to have a known range, and the controller to implement a scale to convert that range into a new range useable by the controller.

The following description will now describe one example application that may be carried out using the arrangement 400.

With the arrangement 400, in one embodiment, the heating power source 404 may be configured with a setup option that allows a user to enable IR temperature sensing on thermal couple channels of the heating power source 404. As such, when the IR sensor 402 is connected to the heating power source 404, an A/D gain for thermocouple channels may be automatically changed from a thermocouple range (e.g., K-type thermocouple range) to the IR input range, such as the 80-400 mV input range for the IR sensor 402 with an output of 4-20 mA and the biasing resistor 408 of 20Ω. Further, the setup option may allow the user enter a minimum temperature setting and a maximum temperature setting.

Figure 5A:
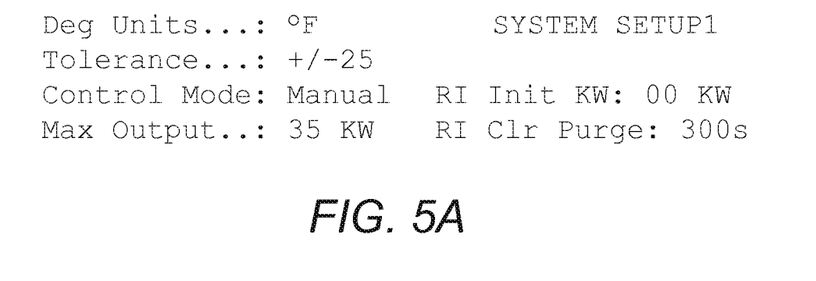
FIGS. 5A and 5B show examples of screen views during a user setup configuration of a heating power source.

FIG. 5A shows an example of a system setup screen on a display of the heating power source 404. To view this screen, the user may simultaneously press the "Parameters" and "Program" buttons. By simultaneously pressing the "Parameters" and "Program" buttons a second time an example screen shown in FIG. 5B will appear on the display of the heating power source 404. The user can then use the "Cursor" and "Increase/Decrease buttons" to set desired input parameters. For instance, the user can adjust "IR Input Max" and/or "IR Input Min" temperature setting to change a selected temperature range to be measured.

Figure 5B:
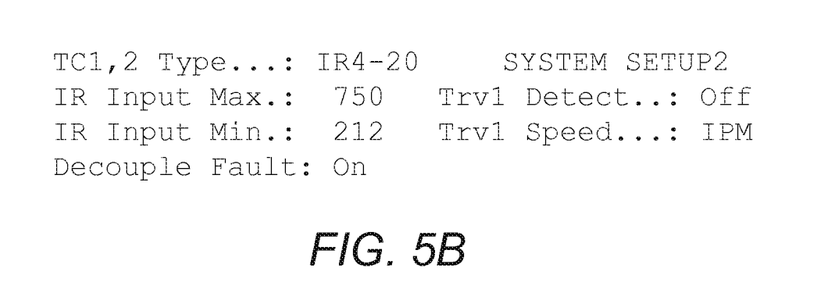

When the "TC1,2 Type . . . :" parameter shown in FIG. 5B is set to IR4-20, the heating power source 404 will look for an IR signal voltage equivalent to 4-20 mA current dropped across a 20 ohm resistor. In a preferred embodiment, the resulting input signal voltage is above the type-K thermocouple voltage so that there is no overlap between an input signal range associated with a thermocouple temperature sensor and an IR temperature sensor.

Effectively, by setting the IR input signal range (e.g., an input voltage range) to the heating power source 404 to be different from an input signal range associated with another type of a temperature sensing device that can be connected to the heating power source 404, one can eliminate a potential problem of a users connecting a wrong device and seeing a signal reading that is inaccurate.

In the present example, the "IR Input Min" and "IR Input Max" temperature settings establish the IR sensor's minimum and maximum temperature readings that are correlated to the 4-20 mA output signal. As such, a 4 mA output signal corresponds to a temperature reading of 212 degrees F. while a 20 mA output signal corresponds to a temperature reading of 750 degrees F.

Further, preferably, the Min and Max target temperatures set on the heating power source 404 are respectively 5 degrees C. above a minimum temperature for which the IR temperature sensor 402 is rated for and 5 degrees C. less than a maximum temperature for which the IR temperature sensor 402 is rated for. This ensures a certain margin within which the heating power source 404 can work to control heating at the top and bottom of a specified temperature range of the IR sensor 402.

Note that, although FIGS. 2-5B describe one illustrative embodiment of the present disclosure, variations are possible.

For example, a heating power source may be configured to automatically set a temperature range based on a particular type of a temperature sensor that is connected to the heating power source. The sensor type may be set by a user. For example, the heating power source may be configured with a user sensor-selection menu, allowing a user to select a particular temperature sensors out of different sensor options.

Alternatively, using current technology, the sensor could be tagged with an identification using an RFID tag or a machine readable code such as a bar code. The heating power source would have a suitable reader for the identification tagging such as an RFID reader or barcode reader to read in the type of sensor information, and then choose the protocol to be employed for use with the sensor.

Alternatively, the sensor type may be determined by the heating power source.

In this regard, the heating power source may determine the sensor type by using a digital or analog output of the temperature sensor. In one embodiment, the heating power source is configured by programming to recognize whether a type-K thermocouple or IR sensor is physically connected to the heating power source. In the embodiment, the controller detects the input voltage and then executes the protocol associated with the detected input device. That is to say, if the input voltage is below a predetermined voltage, the controller determines that the input device is a type-K thermocouple, otherwise the input device is determined to be an IR sensor. Alternatively, if the input voltage is above predetermined threshold, the controller determines that the input device is an IR sensor, otherwise the input device is determined to be a type-K thermocouple. Alternatively, if the input voltage is above a predetermined threshold, the controller determines that the input device is an IR sensor, but if the input voltage is below a predetermined threshold is below another predetermined threshold the controller determines that the input device is a type-K thermocouple, otherwise the input device is not recognized and an error is indicated. As yet another alternative, the controller can be programmed to look for input voltages or currents within predetermined ranges, so that if the input voltage falls within a first predetermined range, the controller recognizes the input device as a type-K thermocouple, if the input voltage falls within a second predetermined range, the controller recognizes the input device as an IR sensor, but if the input voltage falls outside of any predetermined range, the input device is not recognized and the controller notifies the operator as appropriate.

Although an IR temperature sensor with an output in the form of a current signal has been described above, IR temperature sensors with a different type of a signal output (e.g., a voltage signal) may be used instead. Similarly, IR temperature sensors having an output signal range other than a 4-20 mA range may be used instead (e.g., 0-20 mA, 0-10V, etc.). One skilled in the art will appreciate that a control algorithm as described above can be established/modified accordingly to accommodate different types of signals and/or output signal ranges.

Although arrangements utilizing only one temperature sensor have been described above, the control principles of the present disclosure can be modified for a different number of temperature sensors and/or temperature sensing inputs. However, the heating power source (e.g., the ProHeat® 35) can also be configured to use only one temperature sensor type and a set temperature range.

In other embodiments, an IR sensor may be replaced by another temperature sensing technology such as a thermocouple (e.g., a K-type thermocouple), thermistor, or a bolometer type device. For example, the control principles of the present disclosure can be modified to convert IR temperature sensor output to a K-type thermocouple output.

Figure 6:
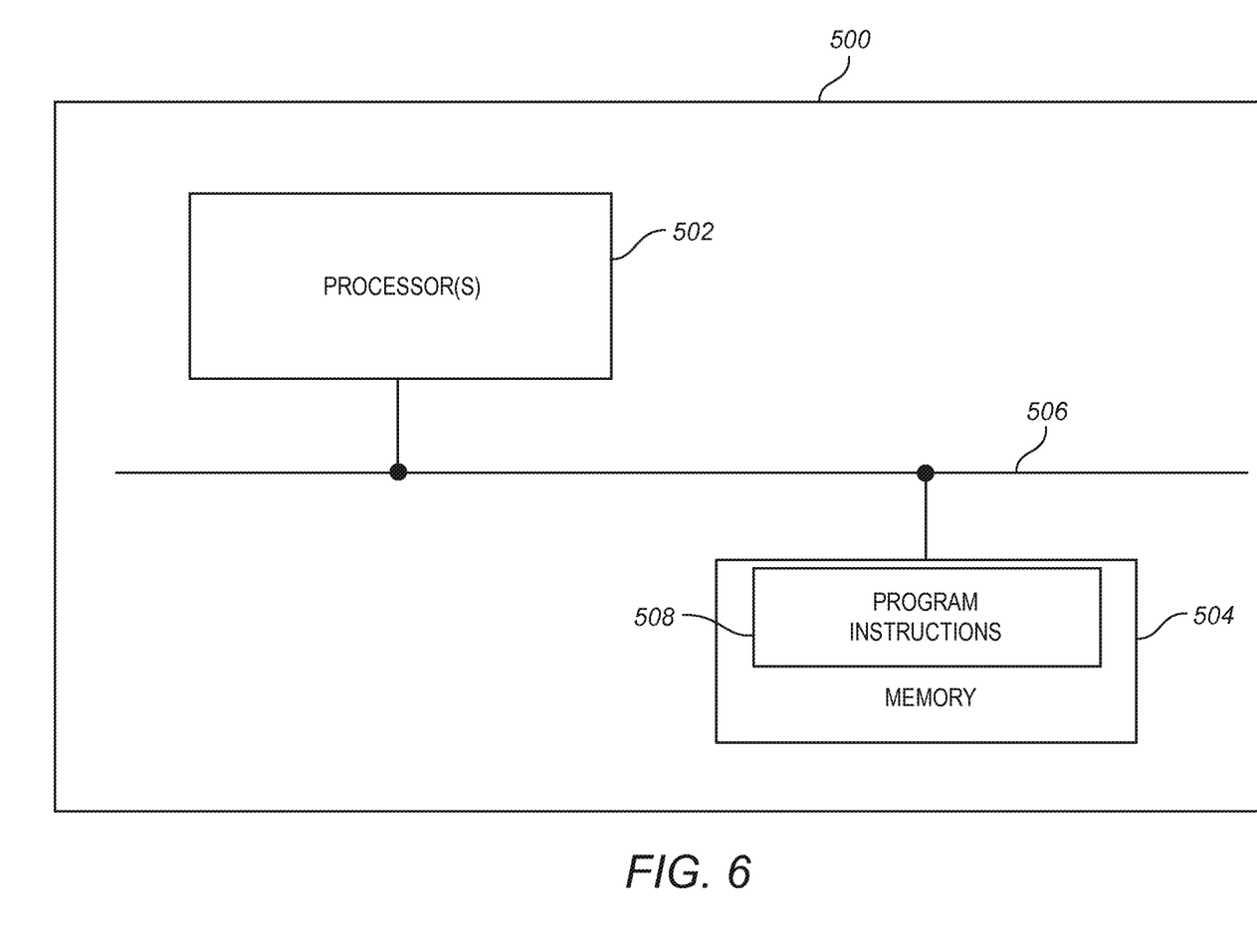
FIG. 6 illustrates one example a processing system in accordance with the illustrative embodiment.

In accordance with the illustrative embodiment, various functions described herein could be carried out by a processing system 500, example of which is shown in FIG. 6. The processing system 500 includes at least one processor 502 and memory 504, coupled together via a bus 506. The processing system 80 may be, for example, incorporated in the controller 206 or its components may be distributed across the controller 206 and other element(s) of the heating power source 202. For example, the memory 504 may be external to the controller 206. Various examples are possible.

In one embodiment, the processor(s) 502 may be dedicated processor(s) or general purpose processor(s) configured to execute computer-readable program code. The memory 504 may be volatile or non-volatile non transitory computer-readable medium or media, now known or later developed. The memory 504 may hold program logic comprising program instructions 508 (e.g., machine language instructions) executable by the processor(s) 502 to carry out various functions described herein. In this regard, the program logic held in the memory 504 will preferably define an algorithm configured to correlate the output signal range of the temperature sensor 204 to a predetermined temperature range as described above.

Additionally, the memory 504 may also store any other data, such as data used by the processor(s) 502 in the execution of the program instructions 508. However, any additional data may also be held in other data storage location(s) separate from the memory 504.

Further, although not shown in FIG. 6, the processing system 500 may include a number of interfaces, such as user interface(s) (e.g., user programming interface), communication interface(s) (e.g., an interface for communicating data to from the memory 504 related to a temperature output signal), and/or the like. Also, other elements (e.g., modules, input lines, buses, etc.) may be included as well.

Advantageously, with a benefit of the present disclosure, a user can use a heating power source or any other device providing a temperature control and/or monitoring with a range of different temperature sensors to measure temperatures within a temperature range required by a given application, even if a desired temperature sensor has a limited temperature range. Further, in the context of an induction power source such as the ProHeat® 35, the present disclosure provides a way to measure temperature with respect to a heating systems using moving parts, such as a rolling inductor and a pipe and/or flat surface.

Figure 7:
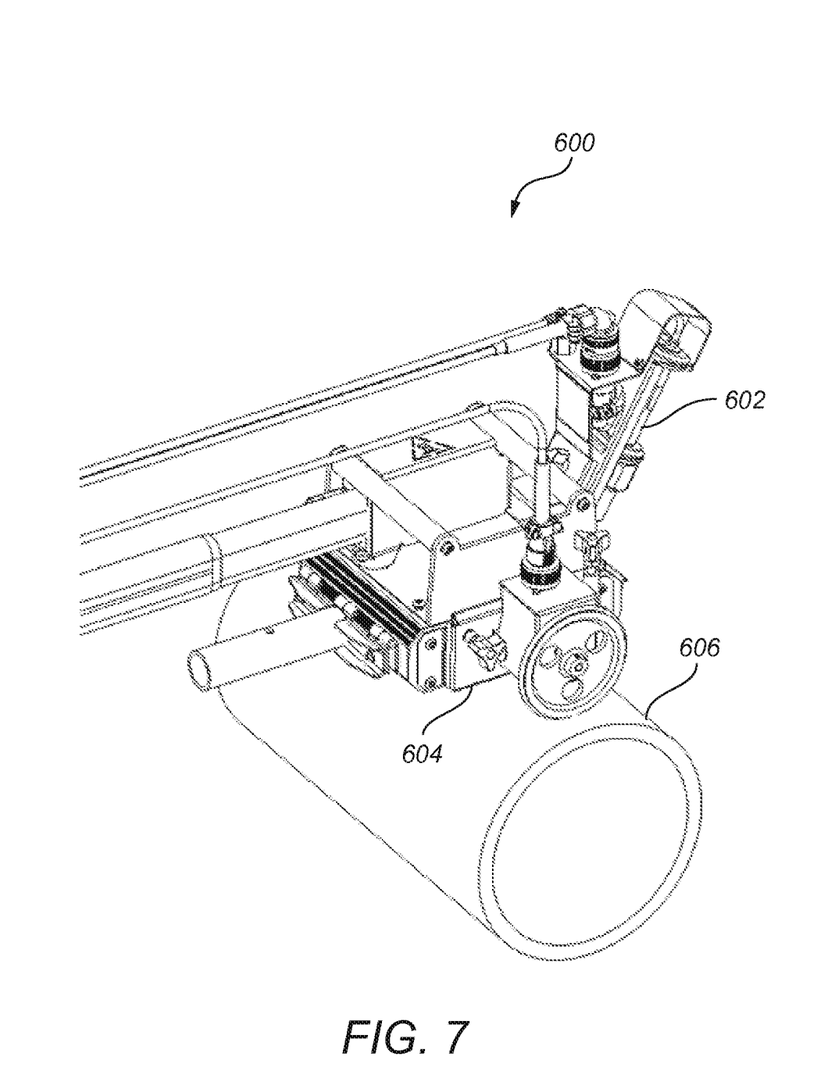
FIG. 7 illustrates an arrangement in which an IR temperature sensor is mounted to a rolling inductor.

To illustrate, FIG. 7 shows an arrangement 600 in which an IR temperature sensor 602 is mounted to a rolling inductor 604. As noted above, IR sensors often do not cover a heating range of a given heating device (e.g., the ProHeat® 35). However, with the methods described herein, it is possible to use the IR temperature sensor 602 to measure substantially precisely a temperature within an area where the rolling inductor 604 is heating, such a particular area on a workpiece, such as a pipe 606.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Further, while the invention has been described mainly in connection with an induction heater for welding purposes, it has broader applicability, including, but not limited to, welding power supplies, cutting power supplies, and liquid cooled heating cables. Further, the sensors can be handheld or fixtured.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc, may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, MRAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method for measuring temperatures within one or more temperature ranges from multiple sensors, the method comprising:
    providing an induction heating device with a controller that effects temperature control or temperature monitoring;
    receiving, via the controller, a user selection for a first minimum temperature value and a first maximum temperature value of a first temperature range to be measured, and a second minimum temperature value and a second maximum temperature value of a second temperature range to be measured;
    correlating, via the controller, a known first output signal range of a first temperature sensor to the first temperature range to be measured;
    correlating, via the controller, a known second output signal range of a second temperature sensor to the second temperature range to be measured;
    receiving, via the controller, a user selection to employ the first temperature sensor or the second temperature sensor for a given induction heating operation;
    receiving, via the controller, an output signal from the selected first or second temperature sensors;
    generating, via the controller, a measured temperature value based on the output signal of the first or second temperature sensors; and
    controlling, via the controller, an induction heating power output of the device in response to the measured temperature value.

2. The method of claim 1, further comprising using, via the controller, the measured temperature value to control or monitor temperature with respect to a part whose temperature is being measured.

3. The method of claim 1, further comprising providing, via the controller, the measured temperature value in the form of a temperature reading for display to a user.

4. The method of claim 1, wherein the output signal is a current signal.

5. The method of claim 4, wherein the known first or second output signal range is 4-20 mA.

6. The method of claim 4, wherein the current signal is converted to a voltage signal via a biasing resistor.

7. The method of claim 1, wherein the output signal is a voltage signal.

8. The method of claim 1, wherein the first or second temperature sensor is an infrared (IR) temperature sensor.

9. The method of claim 1, wherein correlating, via the controller, the known first or second output signal range of the first or second temperature sensor to the first or second temperature range to be measured includes correlating a first or second minimum output signal of the temperature sensor to the first or second minimum temperature value and correlating a first or second maximum output signal of the first or second temperature sensor to the first or second maximum temperature value.

10. The method of claim 1, wherein correlating, via the controller, the known first or second output signal range of the first or second temperature sensor to the first or second temperature range to be measured includes using a linear scale.

11. The method of claim 10, wherein the linear scale follows the following relationship:

$$\text{Temp}=(((AD\_{RawInput}-I_{AD\_RawMin})*(T\_{MaxTemp}-T\_{MinTemp}))/((I_{AD\_RawMax})))+T\_{MinTemp},$$

where, $T\_{MinTemp}$ and $T\_{MaxTemp}$ are the first or second minimum and maximum temperature values, respectively, and $I_{AD\_RawMin}$ and $I_{AD\_RawMax}$ are analog-to-digital (A/D) values corresponding to first or second minimum and maximum output current signals of the first or second temperature sensor, respectively.

12. The method of claim 11, wherein the A/D values are computed as follows:

$$\text{AD\_RawInput}=((I\_{Output}*R\_{Bias}*2^{scale}*\text{Gain}))/V\_\text{ref},$$

where,

I_Output is a current output signal from the first or second temperature sensor, AD_RawInput is an input signal received at an A/D converter based on I_Output, R_Bias is a value of a biasing resistor for conversion of the current output signal to an output voltage signal to be input to the A/D converter, and Scale, Gain, and V_ref are values of N for an N-bit converter, A/D gain, and reference voltage for the A/D converter, respectively.

13. The method of claim 1, wherein the first and second temperature ranges do not overlap.

14. The method of claim 1, wherein the first or second minimum temperature and maximum temperature values are selected by a user.

15. An induction heating device, comprising:
a controller;
first and second temperature sensors; and
program logic held in a data storage and executable by the controller to cause the controller to:
receive a first minimum temperature value and a first maximum temperature value of a first temperature range to be measured, and a second minimum temperature value and a second maximum temperature value of a second temperature range to be measured,
correlate a known first output signal range of a first temperature sensor to the first temperature range to be measured,
correlate a known second output signal range of a second temperature sensor to the second temperature range to be measured,
receive a user selection to employ the first temperature sensor or the second temperature sensor for a given induction heating operation,
receive an output signal from the selected first or second temperature sensors corresponding to a temperature of a workpiece,
generate a measured temperature value based on the output signal of the first or second temperature sensors, and
adjust an induction heating power output of the induction heating device in response to the measured temperature value.

16. The device of claim 15, wherein the program logic further causes the controller to control or monitor temperature with respect to a part whose temperature is being measured using the measured temperature value.

17. The device of claim 15, wherein the program logic further causes the controller to display the measured temperature value to a user.

18. The device of claim 15, wherein the first or second temperature sensor is an infrared (IR) temperature sensor and the other of the first or second temperature sensor is a contact thermocouple.

19. The device of claim 15, wherein the first or second temperature sensor is interconnected with the induction heating device via an input interface.

20. The device of claim 19, wherein:
the output signal is a current signal, and
the input interface carries the output signal converted to a voltage signal via a biasing resistor.

* * * * *